United States Patent [19]

Evans

[11] 4,059,281
[45] Nov. 22, 1977

[54] MOUNTING ASSEMBLY FOR A CONTROLLABLY MOVABLE FLUID TANK
[75] Inventor: Dafydd W. Evans, Euclid, Ohio
[73] Assignee: Towmotor Corporation, Mentor, Ohio
[21] Appl. No.: 700,241
[22] Filed: June 28, 1976
[51] Int. Cl.² .............................................. B60K 15/08
[52] U.S. Cl. .................................... 280/5 A; 180/69 R
[58] Field of Search ..................... 280/5 A, 5 R, 69 R, 280/68.5; 312/269

[56] References Cited
U.S. PATENT DOCUMENTS

| | | | |
|---|---|---|---|
| 2,088,719 | 8/1937 | Pierson | 312/269 |
| 2,139,989 | 12/1938 | Weiskittel | 312/269 X |
| 2,833,365 | 5/1958 | Kesl et al. | 280/5 A |
| 3,394,772 | 7/1968 | Abold | 280/5 A |

Primary Examiner—Robert R. Song
Assistant Examiner—John A. Pekar
Attorney, Agent, or Firm—Frank L. Hart

[57] ABSTRACT

A fluid tank apparatus has mounting structure including linkage assemblies for moving the tank between first and second positions in response to moving a pivotally movable structure of the vehicle. The mounting structure is of a construction sufficient for maintaining the tank at substantially a preselected attitude at and between said first and second tank positions.

10 Claims, 4 Drawing Figures

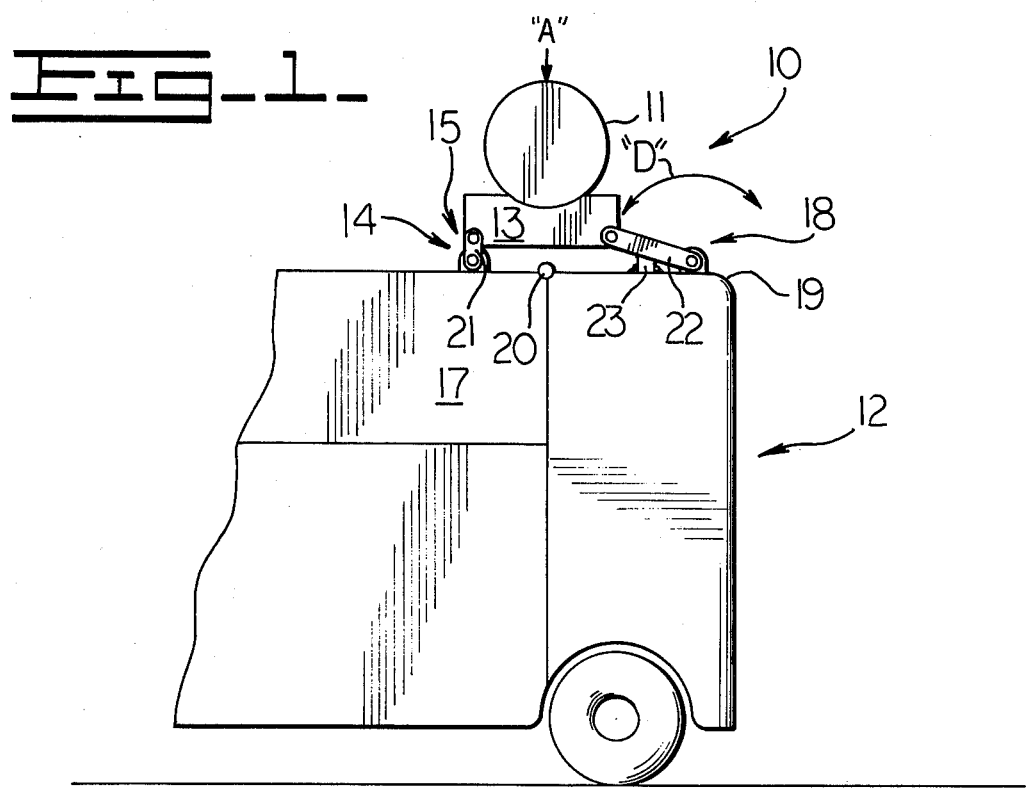
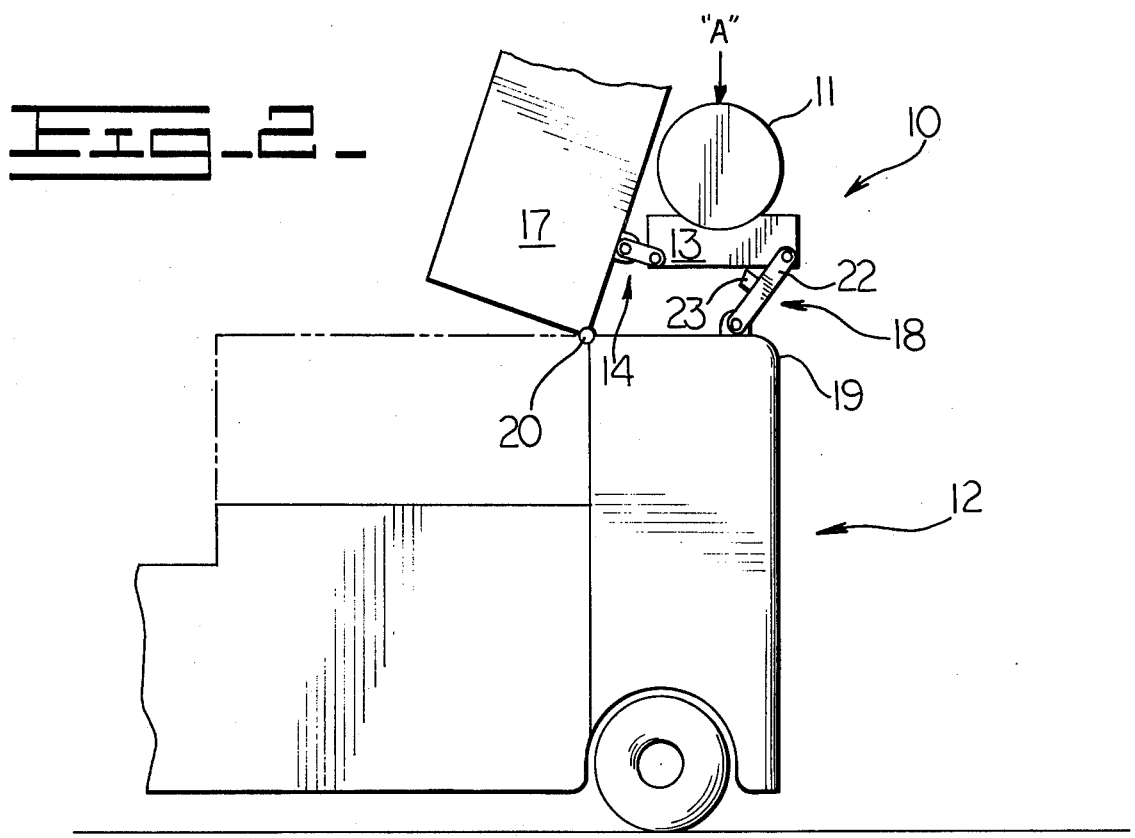

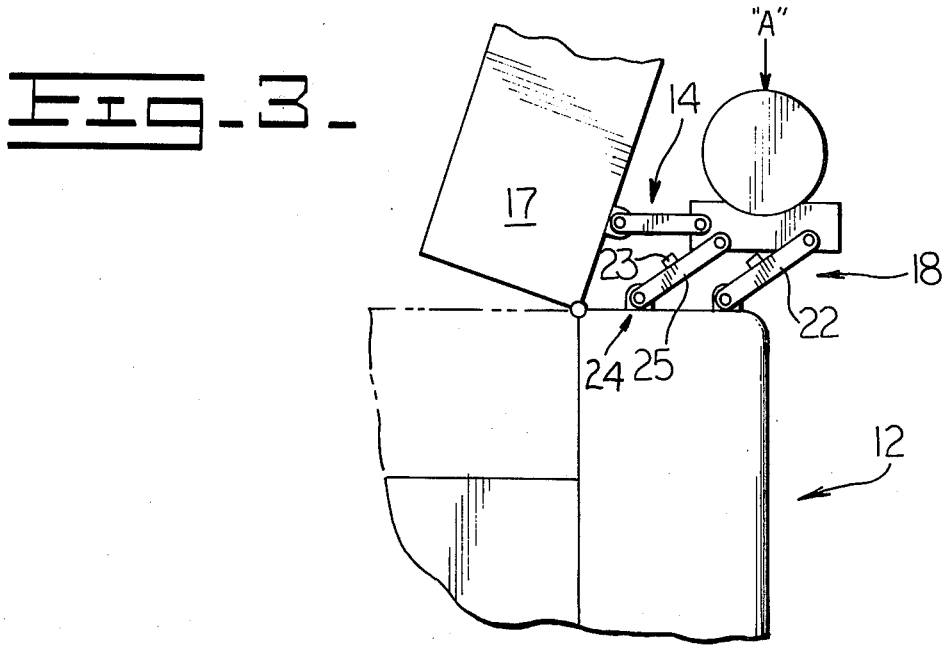
Fig-3-
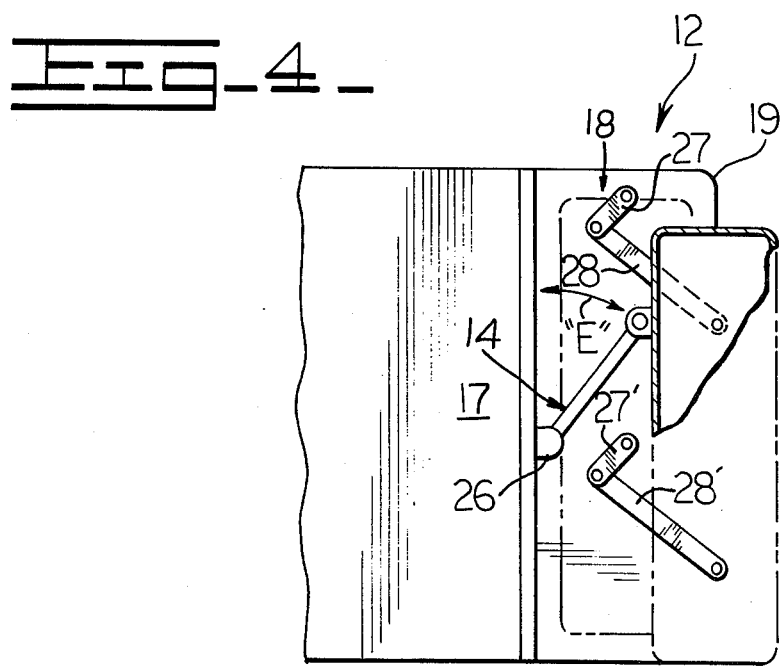
Fig-4-

MOUNTING ASSEMBLY FOR A CONTROLLABLY MOVABLE FLUID TANK

BACKGROUND OF THE INVENTION

In the construction of fork lift vehicles, it is often desirable to maintain the overall size of the vehicle as small as possible in order that said vehicle will cover a small area and have a small turning radius. In such small sized vehicles, the placement of elements of the vehicle becomes of great importance in providing a vehicle which has ready access to the various elements.

One example of element placement on the vehicle is the location of a fluid tank, such as an LPG fuel tank. Where the element is an LPG fuel tank, the problem is compounded by the fact that it is desirable to maintain the tank in a preselected attitude at all times.

The logical positioning of the LPG fuel tank is behind the operator's station. This further compounds the problem by the fact that at the operator's station there is a hood that is often raised and which, in the raised position, would interfere with the fuel tank.

This invention therefore resides in a fluid tank mounting apparatus which has means for moving the tank between first and second positions in response to moving a pivotally movable structure of the vehicle. The mounting means is of a construction sufficient for maintaining the tank at substantially a preselected attitude at and between said first and second positions of the tank.

BRIEF DESCRIPTION OF THE DRAWINGS

FIG. 1 is a diagrammatic side view of a portion of a lift truck vehicle having the apparatus of this invention and the tank being at the first position.

FIG. 2 is a diagrammatic side view of the apparatus of FIG. 1 with the tank at the second position.

FIG. 3 is a diagrammatic side view of another embodiment of the invention; and

FIG. 4 is a diagrammatic side view of yet another embodiment of the invention.

DETAILED DESCRIPTION OF THE INVENTION

Referring to FIG. 1, the mounting apparatus 10 is utilized for connecting a fluid tank 11 to a vehicle 12. This invention is particularly useful where the fluid tank 11 is a fuel tank for providing liquified petroleum gas as a fuel for operating a work vehicle 12, for example, a lift truck.

In such applications of the tank 11, it is desirable to maintain a preselected portion "A" of the tank 11 at substantially preselected attitude at which said portion "A" is maintained at the highest elevation. As is known in the art, liquified petroleum gas (LPG) reservoirs have pressure relief valves which are constructed to open at preselected tank pressures and pass gas from the upper portion of the tank 11 for reducing the pressure within the tank 11. This tank 11 is therefore desirably maintained in a preselected attitude in order to assure that if the pressure relief valve opens, the fluid passed therethrough will be gas from the upper portion of the tank 11, as opposed to liquid from the lower portion of the tank 11.

The tank 11 can be directly connected to the vehicle 12 by the apparatus 10 of this invention or can be connected to the apparatus 10 through a base 13. For purposes of describing this invention, the base 13 is to be considered a portion of the tank 11 and said tank 11 can be fixedly or removably connected to the base 13.

A first means 14 is provided for pivotally connecting a first preselected portion, for example, the left side, of the tank 11 is pivotally movable structure 17 of the vehicle 12.

A second means 18 is provided for pivotally connecting a second preselected position, for example the right side, of the tank 11 to a supporting structure or frame 19 of the vehicle 12.

In this construction, the tank 11 is movable between a first position, shown in FIG. 1, at which the tank is at a first position adjacent and here overlaying a portion of the structure 17 and a second position, shown in FIG. 2, at which the tank 11 is rearwardly displaced from said first position.

The tank 11 is movable from the first position toward the second position in response to pivotally moving the pivotally movable structure 17 from its first or closed position shown in FIG. 1 toward its second or open position shown in FIG. 2. The tank 11 is movable from the second position toward the first position in response to pivotally movable structure 17 from its open position of FIG. 2 toward its closed position of FIG. 1. The pivotally movable structure 17 of the vehicle 12 can be a hood covering the engine or any other structure that is pivotally movable about its pivot pin 20.

The first and second means 14,18 are necessarily of a construction and configuration for mounting the tank 11 at substantially a preselected attitude at the first and second tank positions and during moving of the tank 11 between said first and second positions, as set forth above.

The first means 14 can be at least one link 21 having one end pivotally connected to the pivotally movable structure 17 of the vehicle 12. Additional links (not shown) can be provided along the first or left side of the tank 11 for increasing stability of the tank 11. Preferably a link 21 is connected to each of the opposed corners of the left side of the tank 11.

The second means 18 can be at least one link 22 having one end pivotally connected to a second or right side of the tank 11 and the other end pivotally connected to the frame 19 of the vehicle 12. Additional links (not shown) can be provided along the second or right side of the tank 11 for increasing stability of the tank 11. Preferably a link 22 is connected to each of the opposed corners of the right side of the tank 11.

The links 21,22 of the first and second means 14,18 are of lengths and configurations sufficient for maintaing the tank against downwardly directed movement at the first position of the tank 11 as shown in FIG. 1. At this first position the tank 11 is rigidly maintained against forces which would tend to move the tank 11.

Stop means 23 can be provided for supplying this supported first position of the tank 11. The stop means 23 at the first position of the tank 11 is contacting the vehicle 12 and supporting the link 22. FIG. 1 shows the stop means 23 connected to the vehicle 12. FIG. 2 shows the stop means 23 connected to link 22 and FIG. 3 shows the stop means 23 being a unitary portion of the links 22.

Referring to FIG. 3, a third means 24, for example link 25, can be provided for pivotally connecting a third or middle portion of the tank 11 to the frame 19 of the vehicle 12. This construction provides increased stability and additional support when a larger volume fluid tank 11 is expected to be utilized. As set forth above with relation to link 22, the third means 24 can be link 25 or links connected to opposed sides of the middle portion of the tank 11.

Referring to FIG. 4, the first means 14 has a ball joint 26 pivotally connecting the tank 11 to the pivotally movable structure 17 of the vehicle 12. In this embodiment, the second means 18 is a link assembly having a plurality of pivotally connected links 27,28. As set forth above, second means 18 can be provided at opposed end portions of the tank as shown by links 27,28 and 27'28'.

Referring to the embodiment of FIG. 1, the first and second means 14,18 are at positions and are of configurations sufficient for moving the tank 11 along a generally upwardly arcuate pathway "D" during moving the tank from the first toward the second position. Referring to the embodiment shown by the plan view of FIG. 4, the first and second means 14,18 are at positions and are of configurations sufficient for moving the tank 11 along a generally horizontally arcuate pathway "E" during moving of the tank 11 between the first and second positions.

The pivotal connections of means 14,18 and structure 17 can be by pins or bolts passing through openings or can be of other construction as is well known in the art.

In the operation of the apparatus, moving of the structure 17 to gain access to associated equipment or space enclosed by said structure 17 causes the tank 11 to move out of the way of the structure 17 while maintaining the tank 11 at a preselected attitude. One skilled in the art can readily size the structure of means 14,18 after the variables of associated structure have been sized.

Other aspects, objects, and advantages of this invention can be obtained from a study of the drawings, the disclosure, and the appended claims.

What is claimed is:

1. In a fluid tank mounting apparatus for connecting the fluid tank to a vehicle, the improvement comprising:
   a vehicle frame;
   a structure pivotally movable relative to the frame from a closed position in a direction towards said fluid tank to an open position;
   first means for pivotally connecting a first preselected portion of the fluid tank to the pivotally movable structure of the vehicle; and
   second means for pivotally connecting a second preselected portion of the fluid tank to the frame of the vehicle for moving the fluid tank between a first position at which said fluid tank is at a first position generally superjacent said pivotally movable structure and a second position at which said fluid tank is displaced from the first position rearwardly, in a direction generally away from the pivotally movable structure, in response to pivotal movement of said structure and maintaining the fluid tank at substantially a preselected attitude at and between said first and second fluid tank positions at which a preselected portion of the fluid tank is maintained at a higher elevation than other tank portions.

2. Apparatus, as set forth in claim 1, wherein the second means comprises at least one link having one end pivotally connected to the second preselected portion of the tank and the other end pivotally connected to the frame of the vehicle.

3. Apparatus, as set forth in claim 1, wherein the first and second means comprise links each pivotally connected to the tank, said links being of lengths and configurations sufficient for maintaining the tank against downwardly directed movement at the first position of the tank.

4. Apparatus, as set forth in claim 3, including a stop element connected to the vehicle frame and being of a configuration sufficient for supporting the second means at the first position of the tank.

5. Apparatus, as set forth in claim 1, including: third means for pivotally connecting a third preselected portion of the tank to the frame of the vehicle.

6. Apparatus, as set forth in claim 5, wherein said third means comprises at least one link having one end pivotally connected to the third preselected portion of the tank and the other end pivotally connected to the vehicle frame.

7. Apparatus, as set forth in claim 1, wherein the first means has a ball joint for pivotally connecting the tank to the pivotally movable structure of the vehicle.

8. Apparatus, as set forth in claim 1, wherein the first and second means are links for moving the tank along a generally upward arcuate pathway during movement of the tank from the first toward the second position.

9. Apparatus, as set forth in claim 1, wherein the first and second means are links for moving the tank along a generally horizontal arcuate pathway during moving of the tank between the first and second positions.

10. Apparatus, as set forth in claim 9, wherein the second means comprises a pair of link assemblies each having a plurality of pivotally connected links.

* * * * *